United States Patent
Takahashi et al.

(10) Patent No.: US 12,196,545 B2
(45) Date of Patent: Jan. 14, 2025

(54) SURFACE PROPERTY ESTIMATION SYSTEM

(71) Applicant: NEC Corporation, Tokyo (JP)

(72) Inventors: Toru Takahashi, Tokyo (JP); Rui Ishiyama, Tokyo (JP); Kengo Makino, Tokyo (JP); Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 409 days.

(21) Appl. No.: 17/764,697

(22) PCT Filed: Oct. 4, 2019

(86) PCT No.: PCT/JP2019/039387
§ 371 (c)(1),
(2) Date: Mar. 29, 2022

(87) PCT Pub. No.: WO2021/065009
PCT Pub. Date: Apr. 8, 2021

(65) Prior Publication Data
US 2022/0326010 A1 Oct. 13, 2022

(51) Int. Cl.
*G06T 7/11* (2017.01)
*G01B 21/30* (2006.01)
*G01N 27/90* (2021.01)

(52) U.S. Cl.
CPC ......... *G01B 21/30* (2013.01); *G01N 27/9046* (2013.01); *G06T 7/11* (2017.01); *G06T 2207/20081* (2013.01)

(58) Field of Classification Search
CPC .... G01B 21/30; G01N 27/9046; G01N 21/84; G06T 7/11; G06T 2207/20081; G06V 20/60; G06V 10/54; G06V 10/82
USPC ......................................................... 382/155
See application file for complete search history.

(56) References Cited

U.S. PATENT DOCUMENTS

2016/0275363 A1* 9/2016 Matsuzaki ........... G06Q 20/208
2017/0286761 A1* 10/2017 Zackay ..................... G06T 7/73
(Continued)

FOREIGN PATENT DOCUMENTS

JP     H07-077416 A    3/1995
JP     2015-129751 A   7/2015
(Continued)

OTHER PUBLICATIONS

International Search Report for PCT Application No. PCT/JP2019/039387, mailed on Dec. 10, 2019.
(Continued)

*Primary Examiner* — Stephen P Coleman

(57) ABSTRACT

A surface property estimation system includes an image acquisition means for acquiring an image of a surface of an object, an estimation means for estimating a surface property from the acquired image by using an estimation model obtained through machine learning with use of an image of a surface of an object and a surface property shown by the image as training data, an extraction means for extracting, from the acquired image, a feature amount unique to the image, and a registration means for storing the estimated surface property and the extracted feature amount in a storage means in association with each other.

6 Claims, 11 Drawing Sheets

(56) References Cited

U.S. PATENT DOCUMENTS

| | | | |
|---|---|---|---|
| 2018/0157898 A1* | 6/2018 | Tsuneno | G06V 20/53 |
| 2019/0287266 A1 | 9/2019 | Takahashi et al. | |
| 2020/0334856 A1 | 10/2020 | Higo et al. | |

FOREIGN PATENT DOCUMENTS

| | | |
|---|---|---|
| JP | 2018-156442 A | 10/2018 |
| JP | 2019-125112 A | 7/2019 |
| WO | 2018/100669 A1 | 6/2018 |

OTHER PUBLICATIONS

Takahashi, T., et al., "Mass-produced Parts Traceability System Based on Automated Scanning of "Fingerprint of Things"", Proceedings of the 2017 Fifteenth IAPR International Conference on Machine Vision Applications (MVA), May 12, 2017. pp. 202-206, ISBN: 978-4-9011-2216-0, (DOI: 10. 23919/MVA. 2017.7986836).

JP Office Action for JP Application No. 2021-550936, mailed on Mar. 14, 2023 with English Translation.

Morimoto et al., "Evaluation of the finishmachining surface by a neural network (The first report, Extraction of amount of surface features and learning algorithm)", The Japan Society for Precision Engineering autumn convention academic lecture collected papers in the 1993 fiscal year, Japan, Japan Society for Precision Engineering, 1993, 525-526 pages .

Kato et al., "Mirror plane description assessment system development", The Japan Society for Precision Engineering autumn convention academic lecture meeting collected lecture papers in the 1995 fiscal year, Japan, Japan Society for Precision Engineering, 1995, 253-254 pages.

* cited by examiner

FIG. 9

| SURFACE PROPERTY | IMAGING CONDITION |
|---|---|
| R1 | P1 |
| ⋮ | ⋮ |
| Rm | Pm |

17012

SURFACE PROPERTY ESTIMATION SYSTEM

This application is a National Stage Entry of PCT/JP2019/039387 filed on Oct. 4, 2019, the contents of all of which are incorporated herein by reference, in their entirety.

TECHNICAL FIELD

The present invention relates to a surface property estimation system, a surface property estimation method, and a storage medium.

BACKGROUND ART

Grasping the surface property of each object (industrial product or the like) is important to manage the product quality and the like. The surface property means information about characteristics and conditions of a surface of an object such as surface roughness and the shape. A typical method for grasping the surface property is to measure the surface property by using a three-dimensional measuring sensor (for example, Patent Literature 1).

However, a method of using a three-dimensional measuring sensor has a problem in the cost, although it is possible to perform measurement with high accuracy. This is because a dedicated tool is needed, a long measurement time is needed, and also a skilled worker is needed.

In view of the above, a method of estimating a surface property from an image of an object has been proposed (for example, Patent Literature 2). Such a method uses an estimation model obtained through machine learning on the basis of an image of a surface of an object and a surface property corresponding thereto.

Meanwhile, quality and distribution of products are managed by applying a manufacturing number, a barcode, a QR core, or the like to each object such as an industrial product or a merchandise. Further, there is art to efficiently realize comprehensive product management from production and distribution to sales of products, lost prevention, theft prevention, and fraud prevention of products via a wireless communication system, by applying an IC tag or RFID to each product.

However, in an individual management method for products using the manufacturing numbers, barcodes, QR codes, IC tags, or RFID tags, it is necessary to apply it to each product. Therefore, there is a problem that the cost becomes enormous in proportion to the volume of the products. Moreover, depending on products such as physically small metallic products or resin products such as screws and bolts, there is often the case where it is impossible to directly put on the manufacturing number or a barcode or attach a tag. Furthermore, even for a product to which a bar code or the like can be given physically or to which a tag can be attached, there is a problem that the appearance or design of the product may be impaired.

In view of the above, another method for performing identification and management of products has been proposed (for example, Patent Literature 3). In this method, fine differences that are naturally caused in the same manufacturing process, such as fine irregularities or patterns on product surfaces or random patters on material surfaces, are acquired as images by using an imaging device such as a camera, and a feature amount unique to an individual product is extracted from the captured image.

Patent Literature 1: JP 2015-129751 A
Patent Literature 2: JP 2018-156442 A
Patent Literature 3: WO 2018/100669 A

SUMMARY

According to a method of estimating a surface property from an image in which an object surface is captured as described above, the surface property can be grasped easily. Further, according to a method of extracting a feature amount unique to an object from an image of a surface of the object as described above, it is possible to easily generate an individual identifier that unique identifies an individual object.

However, a method of estimating a surface property from an image of an object surface and a method of extracting an individual identifier from an image of an object surface are not organically associated with each other. Therefore, it is difficult to estimate a surface property from an image of an object surface and extract the feature amount unique to the object and store them in association with each other.

An object of the present invention is to provide a surface property estimation system that solves the problem described above.

A surface property estimation system, according to one aspect of the present invention, is configured to include an image acquisition means for acquiring an image of a surface of an object;

an estimation means for estimating a surface property from the acquired image by using an estimation model obtained through machine learning with use of an image of a surface of an object and a surface property shown by the image as training data;

an extraction means for extracting, from the acquired image, a feature amount unique to the image; and a registration means for storing the estimated surface property and the extracted feature amount in a storage means in association with each other.

A surface property estimation method, according to another aspect of the present invention, is configured to include acquiring an image of a surface of an object;

estimating a surface property from the acquired image by using an estimation model obtained through machine learning with use of an image of a surface of an object and a surface property shown by the image as training data;

extracting, from the acquired image, a feature amount unique to the image; and storing the estimated surface property and the extracted feature amount in a storage means in association with each other.

A computer-readable storage medium, according to another aspect of the present invention, is configured to store thereon a program for causing a computer to execute processing to acquire an image of a surface of an object;

estimate a surface property from the acquired image by using an estimation model obtained through machine learning with use of an image of a surface of an object and a surface property shown by the image as training data;

extract, from the acquired image, a feature amount unique to the image; and store the estimated surface property and the extracted feature amount in a storage means in association with each other.

With the configurations described above, the present invention is able to estimate the surface property from an image in which an object surface is captured and extract the feature amount unique to the object, and store them in association with each other.

BRIEF DESCRIPTION OF DRAWINGS

FIG. 9 is a diagram illustrating exemplary contents of the surface property estimation system according to the second exemplary embodiment of the present invention.

EXEMPLARY EMBODIMENTS

Next, exemplary embodiments of the present invention will be described with reference to the drawings.

First Exemplary Embodiment

Figure 1:
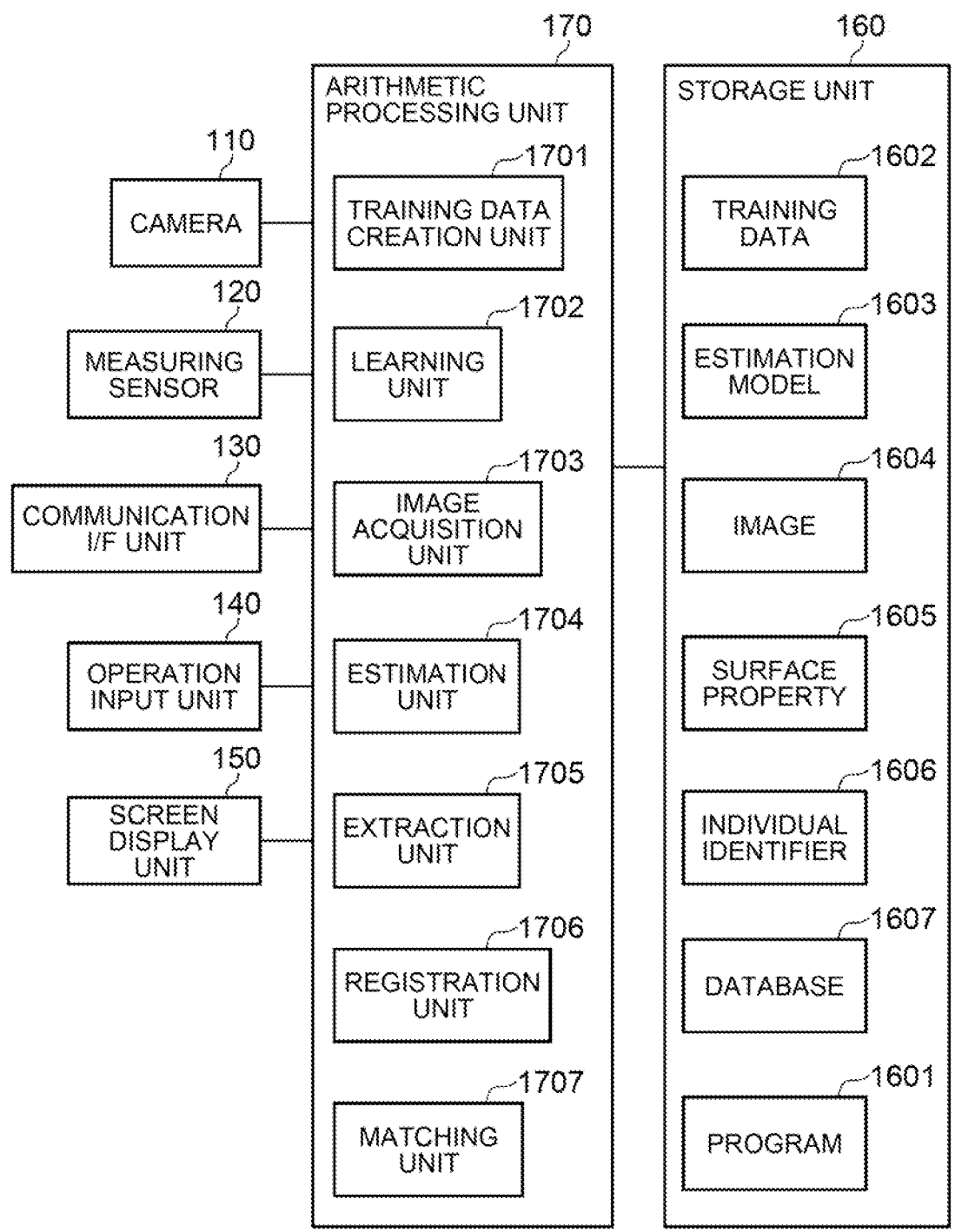
FIG. 1 is a block diagram of a surface property estimation system according to a first exemplary embodiment of the present invention.

FIG. 1 is a block diagram of a surface property estimation system 100 according to a first exemplary embodiment of the present invention. The surface property estimation system 100 is an information processing system configured to estimate the surface property of an object from an image in which a surface of the object such as an industrial product is captured and extract the feature amount unique to the object, and record them in association with each other.

The surface property estimation system 100 includes, as main components, a camera 110, a measuring sensor 120, a communication interface unit (hereinafter referred to as a communication I/F unit) 130, an operation input unit 140, a screen display unit 150, a storage unit 160, and an arithmetic processing unit 170.

The camera 110 is an imaging means for capturing an image of a surface of an object. The camera 110 may be a visible-light color camera or a black-and-white camera equipped with a charge-coupled device (CCD) image sensor or a complementary MOS (CMOS) image sensor having a pixel capacity of about several millions pixels, for example.

The measuring sensor 120 is a sensor for measuring the surface property of an object. As the measuring sensor 120, a measuring sensor of any type such as a contact scanning method, an optical interference method, an image synthesis method by means of focus shift, a confocal method (laser measurement), or the like may be used.

The communication I/F unit 130 is configured of a dedicated data communication circuit, and is configured to perform data communication with various types of devices connected over a wireless network or the like. The operation input unit 140 is configured of operation input devices such as a keyboard and a mouse, and is configured to detect operation by an operator and output it to the arithmetic processing unit 170. The screen display unit 150 is configured of a screen display device such as a liquid crystal display (LCD) or a plasma display panel (PDP), and is configured to display, on a screen, various types of information such as a matching position according to an instruction from the arithmetic processing unit 170.

The storage unit 160 is configured of storage devices such as a hard disk and a memory, and is configured to store therein processing information and a program 1601 necessary for various types of processing in the arithmetic processing unit 170. The program 1601 is a program for implementing various processing units by being read and executed by the arithmetic processing unit 170, and is read in advance from an external device (not illustrated) or a storage medium (not illustrated) via a data input-output function such as the communication I/F unit 130 and is stored in the storage unit 160. The main processing information stored in the storage unit 160 includes training data 1602, an estimation model 1603, an image 1604, a surface property 1605, an individual identifier 1606, and a database 1607.

The training data 1602 includes a plurality of pairs each consisting of a surface image of an object captured by the camera 110 and the surface property represented by the image. The estimation model 1603 is a model learned by means of an object recognition method through deep learning using the training data 1602. When an image is input, the estimation model 1603 outputs the surface property estimated from the image.

The image 1604 is an image of a surface of an object captured by the camera 110. The surface property 1605 is a surface property estimated from the image 1604 by the estimation model 1603. the individual identifier 1606 is a feature amount extracted from the image 1604. The database 1607 is configured to store therein an individual identifier of an object and a surface property in association with each other.

The arithmetic processing unit 170 has a microprocessor such as an MPU and the peripheral circuits, and is configured to read and execute the program 1601 from the storage unit 160 to allow the hardware and the program 1601 to cooperate with each other to thereby implement the various processing units. The main processing units implemented by the arithmetic processing unit 170 includes a training data creation unit 1701, a learning unit 1702, an image acquisition unit 1703, an estimation unit 1704, an extraction unit 1705, a registration unit 1706, and a matching unit 1707.

The training data creation unit 1701 is configured to image a predetermined area of an object surface by the camera 110. The training data creation unit 1701 is also configured to measure the surface property of a predetermined area of an object surface by the measuring sensor 120. The training data creation unit 1701 is also configured to create the training data 1602 from an image of a predetermined area of an object surface captured by the camera 110 and the surface property of the predetermined area of the object surface measured by the measuring sensor 120, and store it in the storage unit 160.

The learning unit 1702 is configured to read the training data 1602 from the storage unit 160, and by using the read training data 1602, create by the machine learning the estimation model 1603 in which an image of an object surface is an input and the surface property represented by the image is an output, and store it in the storage unit 160. The learning unit 1702 is configured to construct the estimation model 1603 on a convolutional neural network (CNN) for example.

The image acquisition unit 1703 is configured to image a predetermined area of an object surface by the camera 110, and store the captured image 1604 in the storage unit 160.

The estimation unit 1704 is configured to read the estimation model 1603 and the image 1604 from the storage unit 160, input the image 1604 to the estimation model 1603, and store the surface property 1605 output from the estimation model 1603 into the storage unit 160.

The extraction unit 1705 is configured to read the image 1604 from the storage unit 160, extract the feature amount unique to the image from the image 1604, and store the extracted feature amount in the storage unit 160 as the individual identifier 1606. As a method of extracting the feature amount unique of the image from the image 1604, a publicly-known method may be used. For example, the extraction unit 1705 may determine at least one location where a luminance change is steep and the position can be obtained stably as a feature point from the image 1604, and put the local luminance pattern around the feature point into data as a feature amount.

The registration unit 1706 is configured to read the surface property 1605 and the individual identifier 1606 from the storage unit 160, and store them in association with each other in the database 1607.

The matching unit 1707 is configured to read the individual identifier 1606 from the storage unit 160, and perform matching between the individual identifier 1606 and an individual identifier stored in the database 1607. Matching with an individual identifier may be performed by using any publicly known method. For example, when the individual identifier is one in which the local luminance pattern around the feature point is put into data as a feature amount, the matching unit 1707 may perform matching by a method as described below. First, the matching unit 1707 obtains, from the two individual identifiers, feature points in which the difference in the feature amount becomes minimum as a pair. Then, the matching unit 1707 extracts, from obtained groups of pairs, only pairs whose relative positional relation with another feature point does not contradict. Then, assuming that the total number of feature points obtained from the two individual identifiers is represented by N, the number of feature point pairs in which the geometric arrangement is correct is represented by "n", the matching unit 1707 calculates a ratio "s" of "n" to N as a matching score of the two individual identifiers. Finally, when the matching score "s" is higher than a predetermined threshold, the matching unit 1707 determines that the two individual identifiers are identical, while when it is not higher, the matching unit 1707 determines that the two individual identifiers are different.

The matching unit 1707 is configured to display the matching result on the screen display unit 150, and/or transmit it to an external device via the communication I/F unit 130. For example, the matching unit 1707 is configured to read the surface property stored in association with the matched individual identifier from the database 1607, display the readout surface property on the screen display 150, and/or transmit it to an external device via the communication I/F unit 130.

Next, operation of the surface property estimation system 100 will be described. Operation of the surface property estimation system 100 is largely divided into a learning operation, a registration operation, and a matching operation. In the learning operation, the training data 1602 is created, and the estimation model 1603 is learned with use of the created training data 1602. In the registration operation, an image of an object to be registered is captured, and from the captured image, the surface property is estimated with use of the estimation model 1603, and also an individual identifier is extracted from the captured image, and the estimated surface property and the extracted individual identifier are registered in the database 1607 in association with each other. In the matching operation, an image of an object that is a matching target is captured, an individual identifier is extracted from the captured image, and matching is performed between the extracted individual identifier and an individual identifier registered in the data, and the matching result is output. Hereafter, details of these operations will be described.

<Learning Operation>

Figure 2:
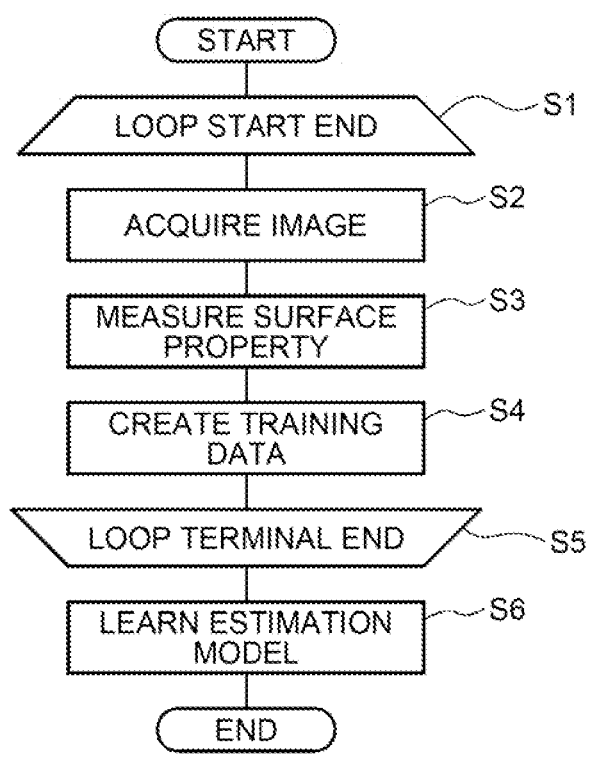
FIG. 2 is a flowchart illustrating an example of a learning operation in the surface property estimation system according to the first exemplary embodiment of the present invention.

FIG. 2 is a flowchart illustrating an example of a learning operation. With reference to FIG. 2, the training data creation unit 1701 repeats steps S2 to S4 the defined number of times (steps S1, S5). The defined number of times is any number of times if it is larger than the number of times in which a required amount of training data is created. For example, when there are a plurality of objects for learning, the surface property estimation system 100 repeats steps S2 to S4 one or more times for each object for learning. At step S2, the training data creation unit 1701 images a predetermined area on a surface of an object for learning by the camera 110. At step S3, the training data creation unit 1701 measures the surface property of the predetermined area by the measuring sensor 120. At step S4, the training data creation unit 1701 creates one unit of training data by associating the image acquired at step S2 and the surface property acquired at step S3, and stores it in the storage unit 160.

Figure 3:
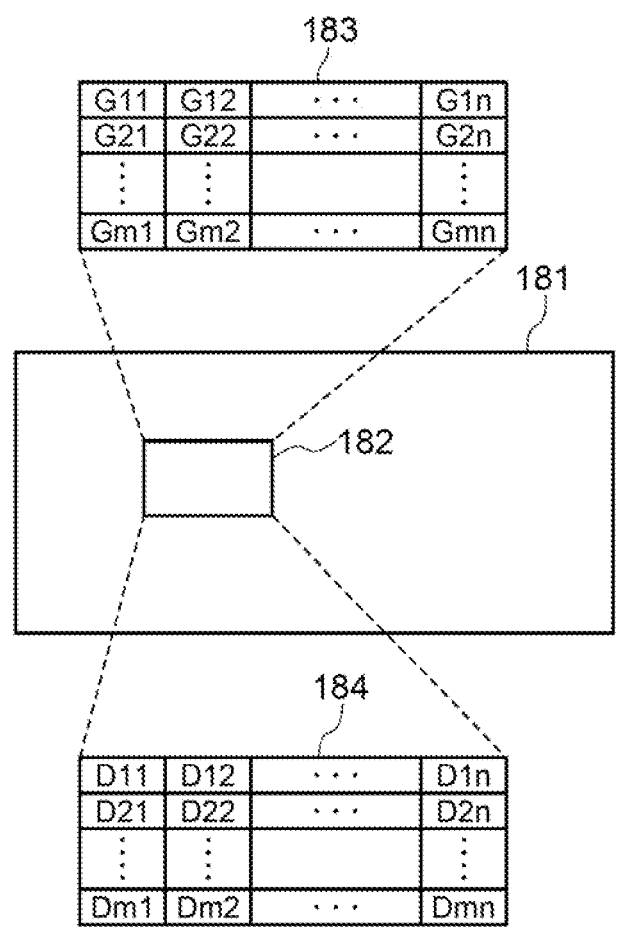
FIG. 3 is a schematic diagram illustrating an operation of a training data creation unit in the surface property estimation system according to the first exemplary embodiment of the present invention.

FIG. 3 is a schematic diagram illustrating an operation of the training data creation unit 1701. In FIG. 3, a reference numeral 181 denotes an object for learning, and a reference numeral 182 denotes an inspection area set on a surface of the object 181. The shape, size and arranged location on the object surface of the inspection area 182 are fixed in advance. Hereinafter, it is assumed that the surface of the object 181 is almost flat and the inspection area 182 is rectangular. Further, as a coordinate system, a rectangular coordinate system is set in which an X axis is set in parallel with a long axis direction, a Y axis is set in parallel with a short axis direction, and a Z axis is set perpendicular to the XY plane, with a lower left end point of the inspection area 182 being the starting point. However, the shape of the inspection area 182 is not limited to rectangular, and any shape is acceptable. Also, the coordinate system is not limited to the rectangular coordinate system as described above, and may be a polar coordinate system.

Further, in FIG. 3, a reference numeral 183 denotes a grayscale image of the inspection area 182 captured by the camera 110. The image 183 is configured of n by m pieces of pixels Gij (i=1, 2, . . . , m, j=1, 2, . . . , n). Further, in FIG. 3, a reference numeral 184 denotes three-dimensional point group data of the inspection area 182 measured by the measuring sensor 120. The three-dimensional point group data 184 is configured of n by m pieces of point data Dij (i=1, 2, . . . , m, j=1, 2, . . . , n). Each piece of the point data Dij represents a three-dimensional location (x, y, z) in the rectangular coordinate system of a point on the object surface. Each piece of point data Dij corresponds to a pixel Gij of the image 183 one to one. That is, the point data Dij and the pixel Gij have the same X coordinate value and the same Y coordinate value. On the other hand, the Z coordinate value of the point data Dij represents the height of the point on the inspection area 182 specified by the X coordinate value and the Y coordinate value.

In the example illustrated in FIG. 3, as the surface property, three-dimensional point group data that is a group of points corresponding to pixels of the image 183 is used. However, the surface property is not limited to the three-dimensional point group data. The surface property may be surface roughness or the like that can be statistically derived from the three-dimensional point group data. Examples of surface roughness include surface roughness parameters such as arithmetic mean estimation (Ra) and maximum height (Rz). Alternatively, the surface property may be a normal vector of the surface shape corresponding to the pixels of the image 183.

Referring to FIG. 2 again, the learning unit 1702 uses the training data 1602 created by the training data creation unit 1701 and creates by the machine learning the estimation model 1603 in which an image of an object surface is an input and the surface property represented by the image is an output, and stores it in the storage unit 160 (step S6).

<Registration Operation>

Figure 4:
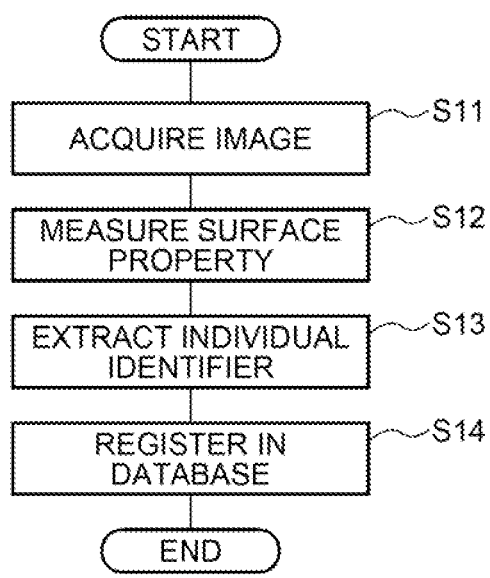
FIG. 4 is a flowchart illustrating an example of a registration operation in the surface property estimation system according to the first exemplary embodiment of the present invention.

FIG. 4 is a flowchart illustrating an example of a registration operation. Referring to FIG. 4, the image acquisition unit 1703 images an inspection area of a surface of an object to be registered by the camera 110, and stores the obtained image 1604 in the storage unit 160 (step S11). Then, the estimation unit 1704 inputs the image 1604 acquired by the image acquisition unit 1703 in the learned estimation model 1603, and stores the surface property 1605 output from the estimation model 1603 in the storage unit 160 (step S12). Next, the extraction unit 1705 extracts the feature amount unique to the image from the image 1604 acquired by the image acquisition unit 1703, and stores the extracted feature amount into the storage unit 160 as the individual identifier 1606 (step S13). Then, the registration unit 1706 stores the surface property 1605 estimated by the estimation unit 1704 and the individual identifier 1606 extracted by the extraction unit 1705 in the database 1607 in association with each other (step S14). When there are a plurality of objects to be registered, the surface property estimation system 100 repeats the same operation as that described above the number of times that is the same as the number of objects to be registered.

Figure 5:
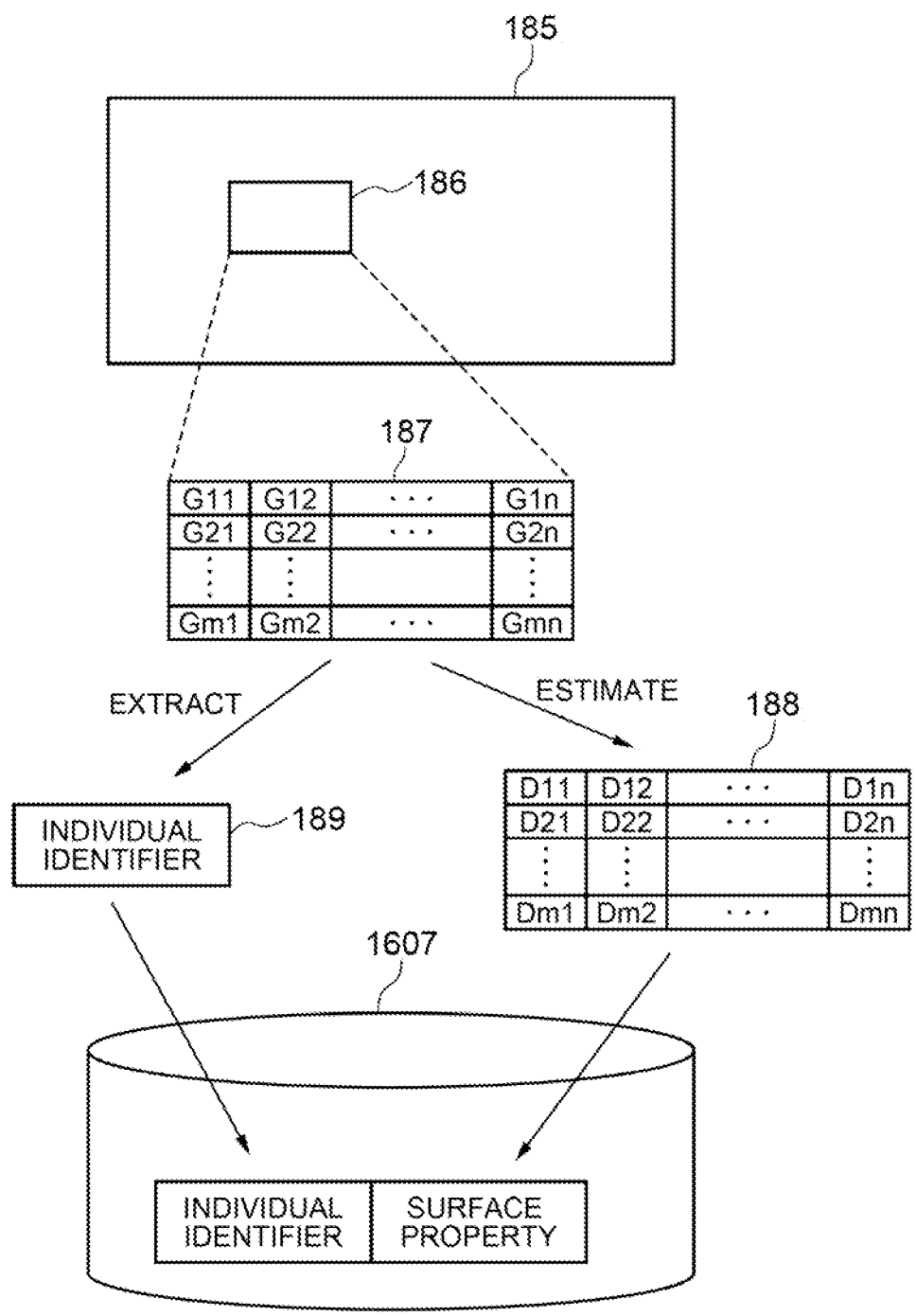
FIG. 5 is a schematic diagram illustrating a registration operation in the surface property estimation system according to the first exemplary embodiment of the present invention.

FIG. 5 is a schematic view illustrating the registration operation. In FIG. 5, a reference numeral 185 denotes an object to be registered, and a reference numeral 186 denotes an inspection area set on a surface of the object 185. The shape, size and arranged location on the object surface of the inspection area 186 are the same as those at the time of learning. Further, in FIG. 5, a reference numeral 187 denotes a grayscale image of the inspection area 186 captured by the camera 110. The image 187 is configured of n by m pieces of pixels Gij (i=1, 2, . . . , m, j=1, 2, . . . , n) that are the same as those at the time of learning. Further, in FIG. 5, a reference numeral 188 denotes the surface property of the inspection area 186 estimated from the image 186 using the estimation model 1603. The surface property 188 is configured of n by m pieces of point data Dij (i=1, 2, . . . , m, j=1, 2, . . . , n) that are the same as those at the time of learning. Further, in FIG. 5, a reference numeral 189 denotes an individual identifier extracted from the image 187 by the extraction unit 1705. The individual identifier 189 and the surface property 188 are registered in the database 1607 in association with each other as illustrated in FIG. 5.

<Matching Operation>

Figure 6:
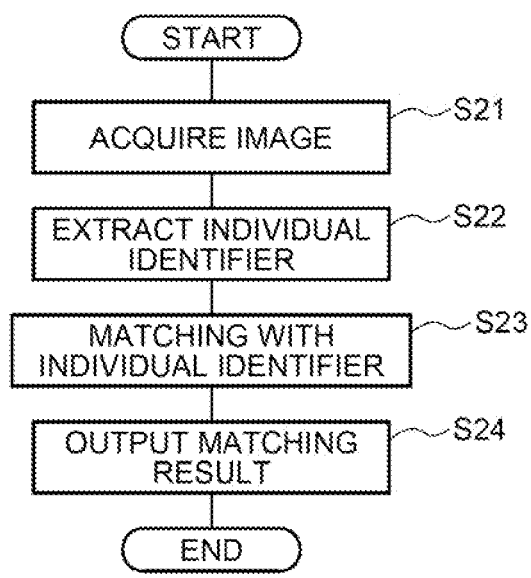
FIG. 6 is a flowchart illustrating an example of a matching operation in the surface property estimation system according to the first exemplary embodiment of the present invention.

FIG. 6 is a flowchart illustrating an example of a matching operation. Referring to FIG. 6, the image acquisition unit 1703 images an inspection area on a surface of an object to be registered by the camera 110, and stores the obtained image 1604 in the storage unit 160 (step S21). Then, the extraction unit 1705 extracts the feature amount unique to the image from the image 1604 acquired by the image acquisition unit 1703, and stores the extracted feature amount in the storage unit 160 as the individual identifier 1606 (step S22). Then, the matching unit 1707 performs matching between the individual identifier 1606 extracted by the extraction unit 1705 and an individual identifier stored in the database 1607 (step S23). Then, the matching unit 1707 displays the matching result on the screen display unit 150, and/or transmits it to an external device via the communication I/F unit 130 (step S24).

Figure 7:
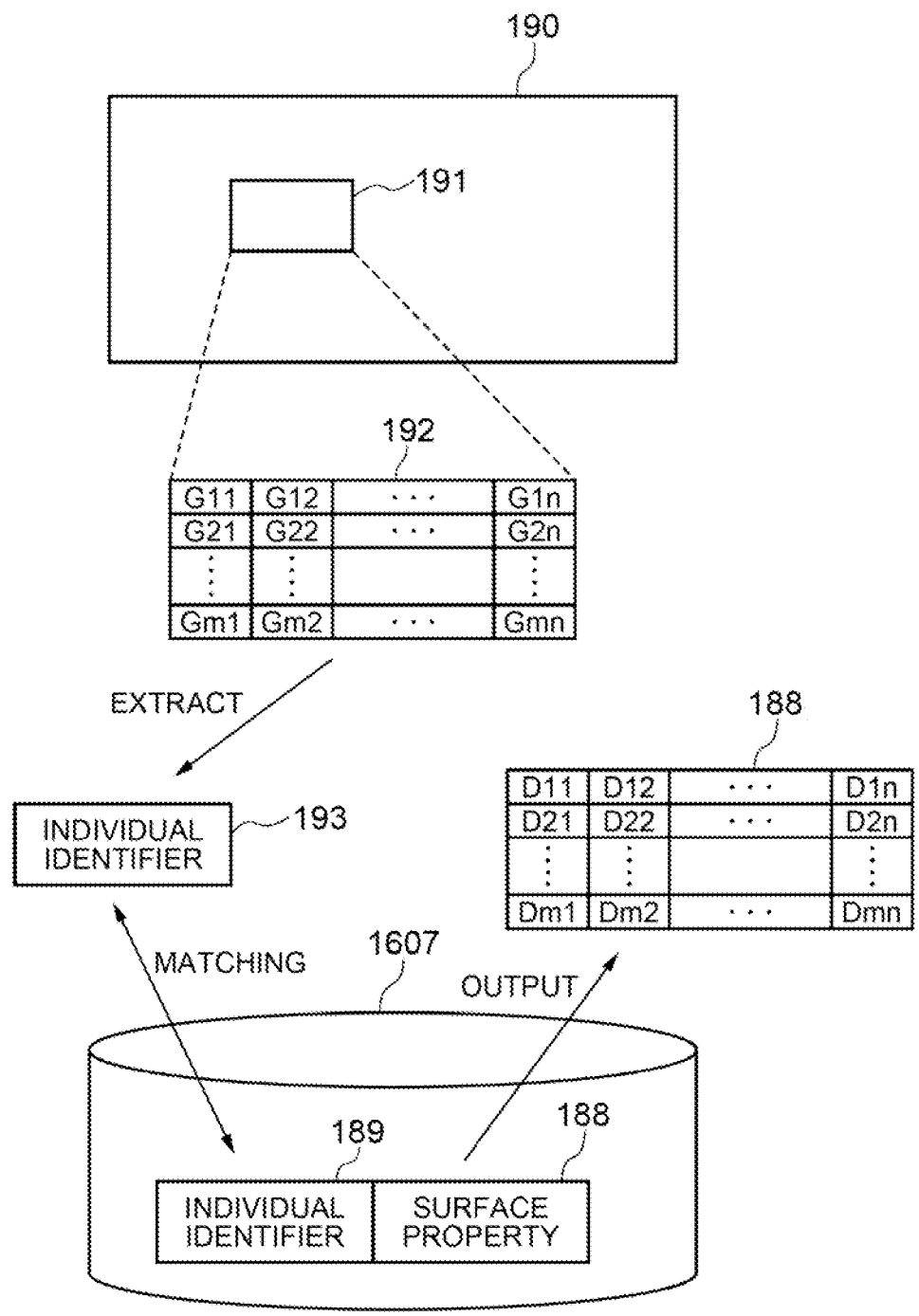
FIG. 7 is a schematic diagram illustrating a matching operation in the surface property estimation system according to the first exemplary embodiment of the present invention.

FIG. 7 is a schematic diagram illustrating the matching operation. In FIG. 7, a reference numeral 190 denotes an object of a matching target, and a reference numeral 191 denotes an inspection area set on a surface of the object 190. The shape, size and arranged location on the object surface of the inspection area 191 are the same as those at the time of learning and at the time of registration. Further, in FIG. 7, a reference numeral 192 denotes a grayscale image of the inspection area 191 captured by the camera 110. The image 192 is configured of n by m pieces of pixels Gij (i=1, 2, . . . , m, j=1, 2, . . . , n) that are the same as those at the time of learning and the time of registration. Further, in FIG. 7, a reference numeral 193 denotes an individual identifier extracted from the image 192 by the extraction unit 1705. Matching is performed on the individual identifier 193 with the entire individual identifiers stored in the database 1607. As a result of matching, when the individual identifier 193 matches the individual identifier 189 stored in the database 1607 for example, a matching result indicating that the object 190 is a proper object is output. At that time, the surface property 188 stored in association with the individual identifier 189 is read out from the database 1607, and is output together with the matching result. On the other hand, when the individual identifier 193 does not match any individual identifier stored in the database 1607, a matching result indicating that the object 190 is a forged product is output.

As described above, according to the surface property estimation system 100 of the present embodiment, it is possible to estimate surface property from an image in which an object surface is captured and to extract the feature amount unique to the object, and record them in association with each other. This is because the present embodiment includes the image acquisition unit 1703 that acquires the image 1604 of a surface of an object, the estimation unit 1704 that estimates the surface property 1605 from the image 1604 by using the estimation model 1603 having been learned, the extraction unit 1705 that extracts the individual identifier 1606 that is a feature amount unique to the image from the image 1604, and the registration unit 1706 that stores the estimated surface property 1605 and the extracted individual identifier 1606 in the database 1607 in association with each other.

Further, according to the present embodiment, at the time of performing matching using an individual identifier, when an object that is a properly registered one, it is possible to extract and output surface property stored in the database 1607 in association therewith at the time of registration. As a result, at the time of performing matching on a proper product, it is possible to confirm easily by using the surface property stored at the time of registration as an image.

Second Exemplary Embodiment

Next, a surface property estimation system 200 according to a second exemplary embodiment of the present invention will be described. As compared with the surface property estimation system 100 described with reference to FIG. 1, the surface property estimation system 200 is the same as the surface property estimation system 100 except for the configuration of a training data creation unit 1701.

Figure 8:
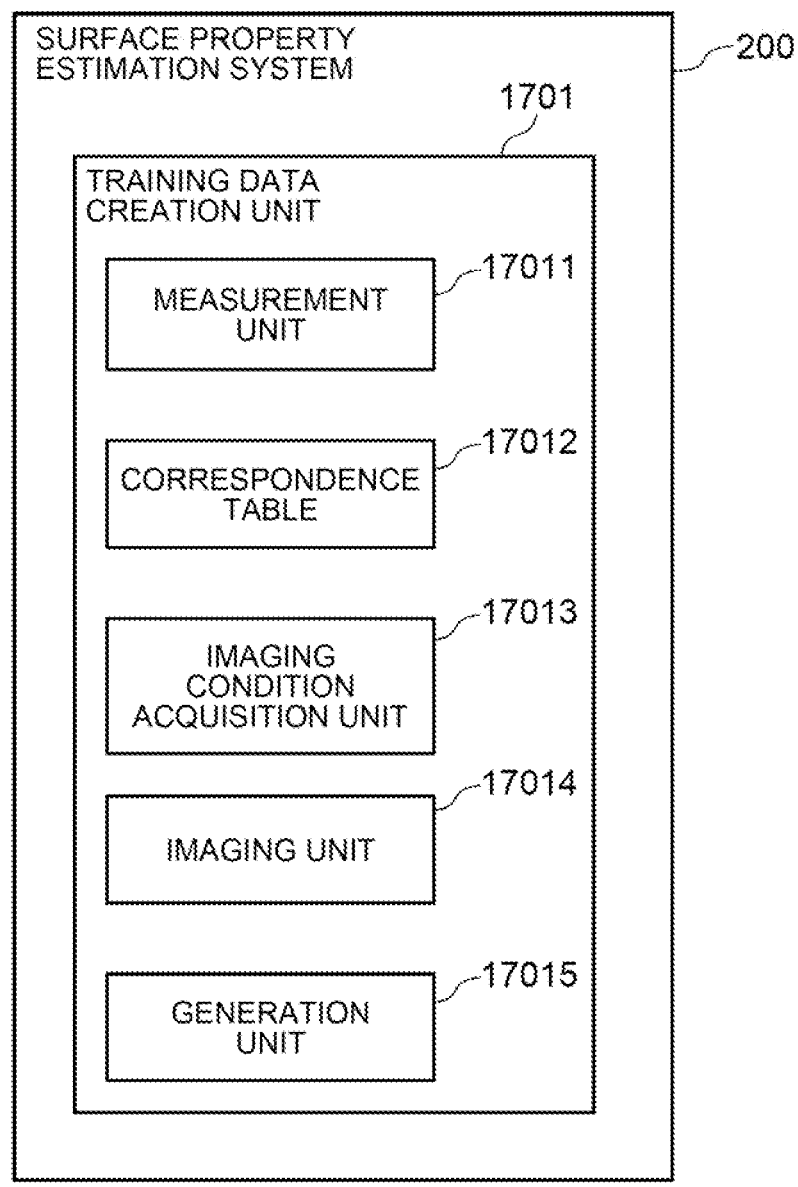
FIG. 8 is a block diagram illustrating a training data creation unit in a surface property estimation system according to a second exemplary embodiment of the present invention.

FIG. 8 is a block diagram illustrating the training data creation unit 1701 in the surface property estimation system 200. Referring to FIG. 8, the training data creation unit 1701 includes a measurement unit 17011, a correspondence table 17012, an imaging condition acquisition unit 17013, an imaging unit 17014, and a generation unit 17015.

The measurement unit 17011 is configured to measure the surface property of a predetermined area of an object surface by the measuring sensor 120. In this example, the surface property is a three-dimensional point group data.

The correspondence table 17012 is a database in which the surface property of an object and an imaging condition are recorded in association with each other. FIG. 9 illustrates exemplary contents of the correspondence table 17012. In this example, the correspondence table 17012 is configured of a plurality of entries, and each entry includes a surface property field and an imaging condition field. When there are "m" types of surface properties, the imaging condition database 1153 is configured of "m" entries, and each entry corresponds to one surface property type one to one. In this example, the surface property stored in each entry is a three-dimensional point group data.

In the imaging condition field of the correspondence table 17012, an imaging condition P1 specifying an imaging condition suitable for imaging the three-dimensional shape of an object surface specified by the surface property with high contract, or the like is recorded. As an imaging condition, an illumination angle may be used, for example. An illumination angle is an angle at which illumination light enters the surface of an object. As another example of an imaging condition, image resolution may be used. Image resolution is expressed in DPI (dot per inch), for example. Moreover, since image resolution and imaging magnification have a certain cause an effect relationship, imaging magnification may be used instead of image resolution. However, the imaging conditions are not limited to the examples described above. Other examples of imaging conditions include a distance between an object and a camera, intensity of illumination light, a wavelength of illumination light, magnitude of illumination, and the like. Imaging conditions specified by the imaging condition P1 or the like may be one or a plurality of the imaging conditions provided above as examples. It is desirable that imaging conditions are learned in advance for each surface property type.

The imaging condition acquisition unit 17013 is configured to, on the basis of the surface property of an object measured by the measurement unit 17011, acquire an imaging condition of the object from the correspondence table 17012. Specifically, the imaging condition acquisition unit 17013 calculates the degree of approximation between the surface property of the measured object and the surface property recorded in each entry of the correspondence table 17012. As a method of calculating the degree of approximation between surface properties, any method may be used if it can quantitatively compare the degrees of approximation between units of information. Then, the imaging condition acquisition unit 17013 acquires, from the correspondence table 17012, an imaging condition recorded corresponding to surface property whose degree of approximation with the measured surface property is the highest (most approximate). Then, the imaging condition acquisition unit 17013 displays the acquired imaging condition on the screen display unit 150 to present it to an operator. As a result, an operator who performs imaging can easily recognize the imaging condition for imaging an object surface. In this example, the imaging condition acquisition unit 17013 is configured to display an acquired imaging condition on the display screen of the screen display unit 150. However, the imaging condition acquisition unit 17013 may be configured to automatically set the imaging environment that conforms to the acquired imaging condition.

The imaging unit 17014 is configured to capture a predetermined area of an object surface by the camera 110 under the imaging condition.

The generation unit 17015 is configured to create the training data 1602 from an image of a predetermined area of an object surface captured by the imaging unit 17014 and the surface property of the predetermined area of the object surface measured by the measuring unit 17011, and store it in the storage unit 160.

Next, operation of the surface property estimation system 200 will be described. Operation of the surface property estimation system 200 is largely divided into a learning operation, a registration operation, and a matching operation. Among them, a registration operation and a matching operation are the same as those of the surface property estimation system 100 according to the first exemplary embodiment. Hereafter, details of a learning operation will be described.

<Learning Operation>

Figure 10:
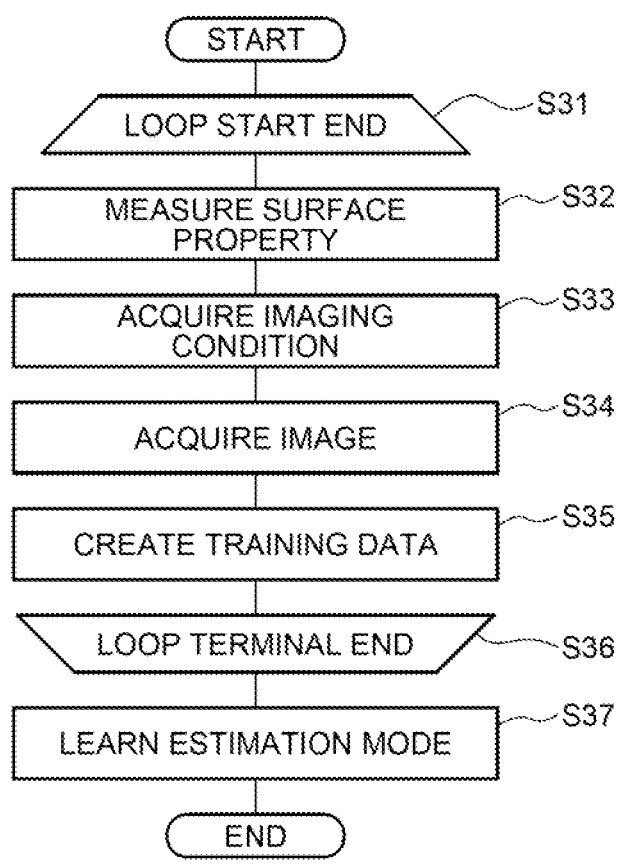
FIG. 10 is a flowchart illustrating an example of a learning operation in the surface property estimation system according to the second exemplary embodiment of the present invention.

FIG. 10 is a flowchart of an example of a learning operation of the surface property estimation system 200. Referring to FIG. 10, the training data creation unit 1701 repeats steps S32 to S35 the defined number of times (steps S31, S36). The defined number of times is any number of times if it is larger than the number of times in which a required amount of training data is created. For example, when there are a plurality of objects for learning, the surface property estimation system 200 repeats steps S32 to S35 one or more times for each object for learning. At step S32, the training data creation unit 1701 measures the surface property of a predetermined area on the surface of an object for learning, by the measuring sensor 120. At step S33, the training data creation unit 1701 acquires, from the correspondence table 17012, an imaging condition stored in association with the surface property approximated to the surface property measured at step S32. At step S34, the training data creation unit 1701 images a predetermined area on a surface of an object for learning by the camera 110, under the imaging environment determined by the acquired imaging condition. At step S35, the training data creation unit 1701 creates one unit of training data by associating the image acquired at step S34 with the surface property acquired at step S32, and stores in the storage unit 160.

Then, as similar to the case of the first exemplary embodiment, the learning unit 1702 uses the training data 1602 created by the training data creation unit 1701 to create, through machine learning, the estimation model 1603 in which an image of an object surface is an input and the surface property shown by the image is an output, and stores it in the storage unit 160 (step S37).

As described above, according to the present embodiment, the three-dimensional shape of a surface of an object for learning can be captured with high contrast. This is because the training data creation unit 1701 measures the surface property of a surface of an object by using the measuring sensor 120, acquires, from the correspondence table 17012, an imaging condition recorded in association with the surface property that is approximate to the measured surface property, and captures an image of the surface of the object under the acquired imaging condition.

As described above, according to the present embodiment, since the three-dimensional shape of a surface of an object for learning can be imaged with high contrast, the quality of the training data configured of the captured image of the object surface and the measured surface property is improved, resulting in an improvement in the estimation accuracy of the estimation model 1603.

In the above description, in the surface property field for an object in each entry of the correspondence table 17012, three-dimensional point group data of an object surface is stored. However, in the surface property field of each entry in the correspondence table 17012, a parameter (for example Ra) of surface roughness that can be statistically calculated from three-dimensional point group data may be recorded, rather than three-dimensional point group data. In the case where correspondence between a parameter of surface roughness and an imaging condition is recorded in the correspondence table 17012, the imaging condition acquisition unit 17013 may be configured to calculate a parameter of surface roughness from three-dimensional point group data of an object for learning measured by the measurement unit 17011, and acquire, from the correspondence table 17012, an imaging condition corresponding to a parameter of surface roughness approximate to the calculated parameter of surface roughness. Note that when the surface property of an object for learning measured by the measurement unit 17011 is a parameter of surface roughness originally, the calculation as described above is unnecessary.

Further, in the surface property field of each entry in the correspondence table 17012, information about another characteristic of an object surface other than surface property may be recorded. Examples of information about other characteristics of an object surface include information representing the material of a surface object. Examples of information representing the material include metal, ceramic, resin, carbon fiber, glass, paper, wood, steel, and the like. Still another example of information about a characteristic of an object surface is a shape of an object (individual identification object) in a captured image. Exemplary shapes include a plane (rectangle), polygon, circle, ring (doughnut-shape), and the like. The shape may be a two-dimensional shape of a surface to be imaged. Moreover, the shape may be a shape of an image area of a surface of an object from which a feature amount is extracted. Other examples of data characterizing an object surface include reflectance of an object surface, transmittance, optical property, processing methods such as a satin process and a turning process, and the like. As described above, when another piece of information characterizing the object surface exists in the correspondence table, the imaging condition acquisition unit 17013 may acquire an imaging condition from the correspondence table while taking into account the other information characterizing the object surface according to the object for learning input from the operator via the operation input unit 140.

Third Exemplary Embodiment

Figure 11:
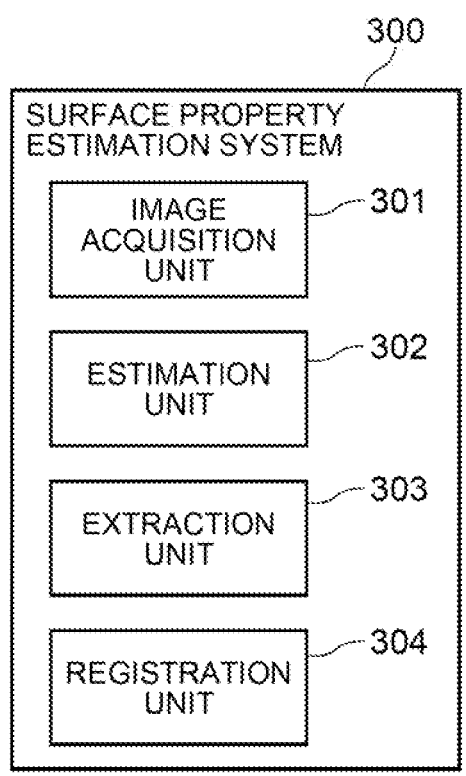
FIG. 11 is a block diagram of a surface property estimation system according to a third exemplary embodiment of the present invention.

Next, a third exemplary embodiment of the present invention will be described with reference to FIG. 11. FIG. 11 is a block diagram of a surface property estimation system 300 according to the present invention.

As illustrated in FIG. 11, the surface property estimation system 300 according to the present embodiment is configured to include an image acquisition unit 301, an estimation unit 302, an extraction unit 303, and a registration unit 304.

The image acquisition unit 301 is configured to acquire an image of a surface of an object. The image acquisition unit 301 may have the same configuration as that of the image acquisition unit 1703 of FIG. 1, but it is not limited thereto.

The estimation unit 302 is configured to estimate the surface property from an image acquired by the image acquisition unit 301, by using an estimation model obtained by means of machine learning using an image of a surface of an object and the surface property shown by the image as training data. The estimation unit 302 may have the same configuration as that of the estimation unit 1704 of FIG. 1 for example, but is not limited thereto.

The extraction unit 303 is configured to extract, from the image acquired by the image acquisition unit 301, a feature amount unique to the image. The extraction unit 303 may have the same configuration as that of the extraction unit 1705 of FIG. 1 for example, but is not limited thereto.

The registration unit 304 is configured to store the surface property estimated by the estimation unit 302 and the feature amount extracted by the extraction unit 303 in a storage unit (not illustrated) in association with each other. The registration unit 304 may have the same configuration as that of the registration unit 1706 of FIG. 1 for example, but is not limited thereto.

The surface property estimation system 300 configured as described above operates as described below. The image acquisition unit 301 acquires an image of a surface of an object. Then, the estimation unit 302 estimates the surface property from the image acquired by the image acquisition unit 301, by using an estimation model that is obtained by machine learning with use of an image of a surface of an object and the surface property shown by the image as training data. Then, the extraction unit 303 extracts, from the image acquired by the image acquisition unit 301, a feature amount unique to the image. Then, the registration unit 304 stores the surface property estimated by the estimation unit 302 and the feature amount extracted by the extraction unit 303 in a storage unit (not illustrated) in association with each other.

As described above, according to the present embodiment, it is possible to estimate the surface property from an image in which an object surface is captured and to extract the feature amount unique to the object, and record them in association with each other. This is because the present embodiment includes the image acquisition unit 301 that acquires an image of a surface of an object, the estimation unit 302 that estimates the surface property from the image acquired by the image acquisition unit 301 by using an estimation model obtained by machine learning with use of an image of a surface of an object and the surface property shown by the image as training data, the extraction unit 303 that extracts, from the image acquired by the image acquisition unit 301, the feature amount unique to the image, and the registration unit 304 that stores the surface property estimated by the estimation unit 302 and the feature amount extracted by the extraction unit 303 in a storage unit (not illustrated) in association with each other.

While the present invention has been described with reference to the exemplary embodiments described above, the present invention is not limited to the above-described embodiments. The form and details of the present invention can be changed within the scope of the present invention in various manners that can be understood by those skilled in the art. For example, configurations as described below are also included in the present invention.

INDUSTRIAL APPLICABILITY

The present invention is applicable to any systems for measuring surface property of an object such as an industrial product and recording it in association with an object identifier.

The whole or part of the exemplary embodiments disclosed above can be described as, but not limited to, the following supplementary notes.

(Supplementary Note 1)

A surface property estimation system comprising:

image acquisition means for acquiring an image of a surface of an object;

estimation means for estimating a surface property from the acquired image by using an estimation model obtained through machine learning with use of an image of a surface of an object and a surface property shown by the image as training data;

extraction means for extracting, from the acquired image, a feature amount unique to the image; and registration means for storing the estimated surface property and the extracted feature amount in a storage means in association with each other.

(Supplementary Note 2)

The surface property estimation system according to supplementary note 1, further comprising training data generation means, wherein the training data generation means includes:

measuring means for measuring the surface property of the object by using a measuring sensor;

a correspondence table in which a surface property and an imaging condition are associated with each other;

imaging condition acquisition means for calculating a degree of approximation between the measured surface property and the surface property recorded in the correspondence table, and acquiring an imaging condition from the correspondence table on a basis of the calculated degree of approximation;

capturing means for capturing an image of a surface of an object under the acquired imaging condition; and generation means for generating the training data from the captured image and the measured surface property.

(Supplementary Note 3)

The surface property estimation system according to supplementary note 1 or 2, further comprising matching means for performing matching between the extracted feature amount and the feature amount stored in the storage means, and outputting a surface property stored in the storage means in association with a feature amount that conforms to the extracted feature amount.

(Supplementary Note 4)

The surface property estimation system according to any of supplementary notes 1 to 3, wherein the surface property is three-dimensional point group data.

(Supplementary Note 5)

The surface property estimation system according to any of supplementary notes 1 to 3, wherein the surface property is a parameter of surface roughness.

(Supplementary Note 6)

A surface property estimation method comprising:

acquiring an image of a surface of an object;

estimating a surface property from the acquired image by using an estimation model obtained through machine learning with use of an image of a surface of an object and a surface property shown by the image as training data;

extracting, from the acquired image, a feature amount unique to the image; and storing the estimated surface property and the extracted feature amount in a storage means in association with each other.

(Supplementary Note 7)

The surface property estimation method according to supplementary note 6, further comprising generating the training data, wherein the generating the training data includes:

measuring the surface property of the object by using a measuring sensor;

calculating a degree of approximation between the measured surface property and a surface property recorded in a correspondence table in which the surface property and an imaging condition are associated with each other, and acquiring an imaging condition from the correspondence table on a basis of the calculated degree of approximation;

capturing an image of a surface of an object under the acquired imaging condition; and generating the training data from the captured image and the measured surface property.

(Supplementary Note 8)

A computer-readable storage medium storing thereon a program for causing a computer to execute processing to:

acquire an image of a surface of an object;

estimate a surface property from the acquired image by using an estimation model obtained through machine learning with use of an image of a surface of an object and a surface property shown by the image as training data;

extract, from the acquired image, a feature amount unique to the image; and store the estimated surface property and the extracted feature amount in a storage means in association with each other.

REFERENCE SIGNS LIST 100 surface property estimation system
110 camera
120 measuring sensor
130 communication I/F unit
140 operation input unit
150 screen display unit
160 storage unit
1601 program
1602 training data 1603 estimation model
1604 image
1605 surface property
1606 individual identifier
1607 database
170 arithmetic processing unit
1701 training data creation unit
17011 measurement unit
17012 correspondence table
17013 imaging condition acquisition unit
17014 imaging unit
17015 generation unit
1702 learning unit
1703 image acquisition unit
1704 estimation unit
1705 extraction unit
1706 registration unit
1707 matching unit
181 object
182 inspection area
183 image
184 surface property
185 object
186 inspection area
187 image
188 surface property
189 individual identifier
190 object
191 inspection area
192 image
193 individual identifier
200 surface property estimation system
300 surface property estimation system
301 image acquisition unit
302 estimation unit
303 extraction unit
304 registration unit

What is claimed is:

1. A surface property estimation system comprising:
a first memory storing program instructions; and
a processor coupled to the first memory and configured to execute the program instructions to:
measure a surface property of a training object by using a measuring sensor;
calculate a degree of approximation between the measured surface property and a surface property recorded in a correspondence table in which the surface property and an imaging condition are associated with each other;
acquire the imaging condition from the correspondence table on a basis of the calculated degree of approximation;
capture a training image of a surface of the object under the acquired imaging condition;
generate training data from the captured training image and the measured surface property;
train an estimation model via machine learning using the generated training data;
acquire an image of a surface of an object;
estimate a surface property from the acquired image by using the trained estimation model;
extract, from the acquired image, a feature amount unique to the image; and
store the estimated surface property and the extracted feature amount in a second memory in association with each other.

2. The surface property estimation system according to claim 1, wherein the processor is further configured to execute the program instructions to:
perform matching between the extracted feature amount and another feature amount stored in the second memory; and
output a surface property stored in the second memory in association with the another feature amount that matches the extracted feature amount.

3. The surface property estimation system according to claim 1, wherein the surface property is three-dimensional point group data.

4. The surface property estimation system according to claim 1, wherein the surface property is a parameter of surface roughness.

5. A surface property estimation method performed by a computer and comprising:
measuring a surface property of a training object by using a measuring sensor;
calculating a degree of approximation between the measured surface property and a surface property recorded in a correspondence table in which the surface property and an imaging condition are associated with each other;
acquiring the imaging condition from the correspondence table on a basis of the calculated degree of approximation;
capturing a training image of a surface of the object under the acquired imaging condition;
generating training data from the captured training image and the measured surface property;
training an estimation model via machine learning using the generated training data;
acquiring an image of a surface of an object;
estimating a surface property from the acquired image by using the trained estimation model;
extracting, from the acquired image, a feature amount unique to the image; and
storing the estimated surface property and the extracted feature amount in a memory in association with each other.

6. A non-transitory computer-readable storage medium storing a program comprising instructions for causing a computer to execute processing to:
measure a surface property of a training object by using a measuring sensor;
calculate a degree of approximation between the measured surface property and a surface property recorded in a correspondence table in which the surface property and an imaging condition are associated with each other;
acquire the imaging condition from the correspondence table on a basis of the calculated degree of approximation;
capture a training image of a surface of the object under the acquired imaging condition;
generate training data from the captured training image and the measured surface property;
train an estimation model via machine learning using the generated training data;
acquire an image of a surface of an object;
estimate a surface property from the acquired image by using the trained estimation model;
extract, from the acquired image, a feature amount unique to the image; and store the estimated surface property and the extracted feature amount in a memory in association with each other.

* * * * *